(12) United States Patent
Howe et al.

(10) Patent No.: US 7,530,286 B2
(45) Date of Patent: May 12, 2009

(54) SHIFT LOCK ASSEMBLY

(75) Inventors: Brian Douglas Howe, Shelby Township, MI (US); Steve Wieczerza, White Lake, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 619 days.

(21) Appl. No.: 11/220,334

(22) Filed: Sep. 6, 2005

(65) Prior Publication Data
US 2007/0137364 A1 Jun. 21, 2007

(51) Int. Cl.
*B60K 20/00* (2006.01)
*G05G 5/06* (2006.01)

(52) U.S. Cl. .................................. 74/473.21; 74/532

(58) Field of Classification Search ............... 74/473.1, 74/473.12, 473.21, 473.22, 473.23, 473.24, 74/473.25, 473.26, 473.28, 527, 532, 533, 74/534
See application file for complete search history.

(56) References Cited

U.S. PATENT DOCUMENTS

| 5,062,509 | A | 11/1991 | Carpenter et al. |
| 5,150,593 | A | 9/1992 | Kobayashi et al. |
| 5,293,763 | A | 3/1994 | Assano et al. |
| 5,309,744 | A | 5/1994 | Kito et al. |
| 5,379,872 | A | 1/1995 | Dorr et al. |
| 5,797,476 | A * | 8/1998 | Jones et al. ............... 194/346 |
| 6,794,972 | B2 | 9/2004 | Rudisil et al. |
| 2003/0221499 | A1 | 12/2003 | Wong |
| 2005/0160859 | A1* | 7/2005 | Buerger et al. ............ 74/473.1 |
| 2005/0223835 | A1* | 10/2005 | Wang ..................... 74/473.18 |
| 2006/0016287 | A1* | 1/2006 | Grossman et al. ........ 74/473.21 |

* cited by examiner

*Primary Examiner*—Richard W L Ridley
*Assistant Examiner*—James Pilkington
(74) *Attorney, Agent, or Firm*—Gifford, Krass, Sprinkle, Anderson & Citkowski, P.C.; Kevin S. MacKenzie; Dean B. Watson

(57) ABSTRACT

A shift lock assembly including a shifter base and a shift lever having a pivot member that is associated with the shifter base. A detent member having an upper portion including engaging features is coupled to the pivot member. A lock lever having opposing sides and a first end pivotally attached to the shifter base and a second end adapted to contact the engaging features of the detent member is also included. At least one solenoid is connected to the lock lever for pivotally moving the lock lever relative to the detent member wherein the at least one solenoid moves the lock lever between low, middle and high positions in response to control parameters.

13 Claims, 5 Drawing Sheets

SHIFT LOCK ASSEMBLY

FIELD OF THE INVENTION

This invention relates to shifters, and with more particularity to shifters having a shift lock assembly.

BACKGROUND OF THE INVENTION

Various shift lock devices are known in the art. Such devices include automatic transmission shifters linked with a transmission selector lever that is capable of moving from park position to various drive selections. Many of these types of devices include brake-transmission interlock type devices that lock the transmission shift lever in park until a brake pedal is depressed. Such devices are designed such that the automobile does not lurch forward when shifted from a park position to a drive position.

Various designs have been utilized by the prior art to achieve the desired brake-transmission interlock. However, such devices are limited in that they provide only an interlock between the transmission shifter in a park position and the depressing of a brake pedal. There is therefore a need in the art for a shift lock assembly capable of locking in a broad range of transmission positions based on responses to various control parameters.

SUMMARY OF THE INVENTION

A shift lock assembly including a shifter base and a shift lever having a pivot member that is associated with the shifter base. A detent member having an upper portion including engaging features is coupled to the pivot member. A lock lever having opposing sides and a first end pivotally attached to the shifter base and a second end adapted to contact the engaging features of the detent member is also included. At least one solenoid is connected to the lock lever for pivotally moving the lock lever relative to the detent member wherein the at least one solenoid moves the lock lever between low, middle and high positions in response to control parameters.

DETAILED DESCRIPTION OF THE PREFERRED EMBODIMENTS

Figure 1:
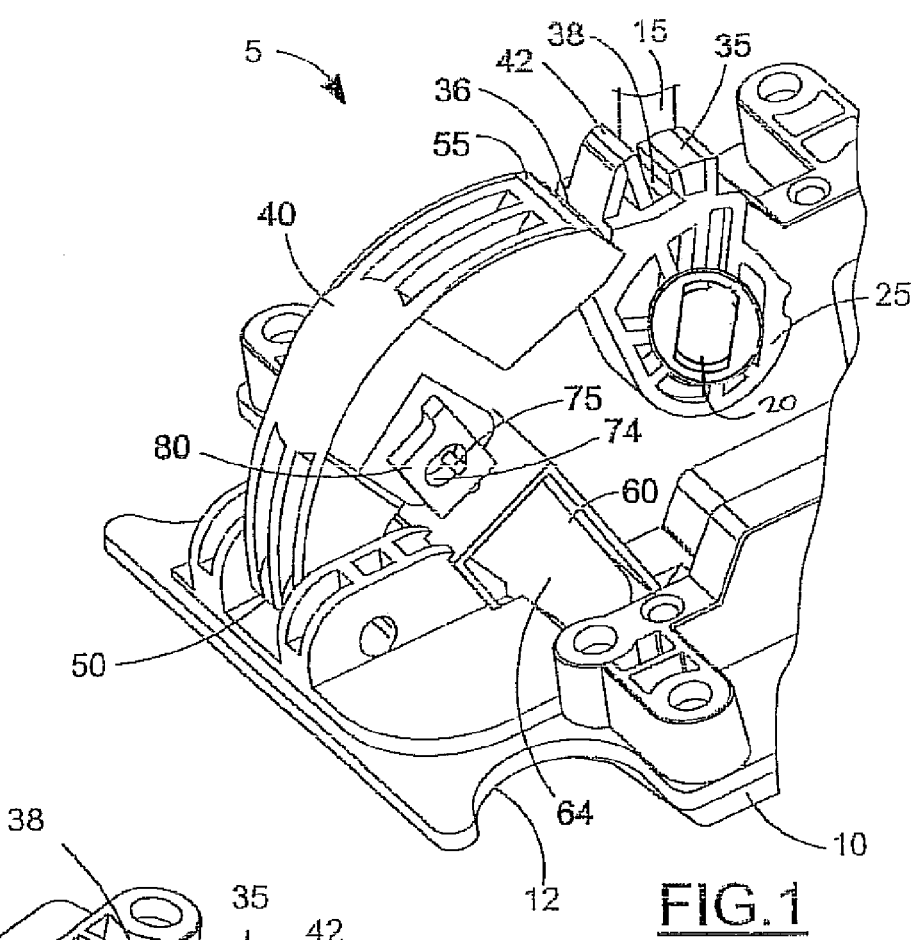
FIG. 1 is a partial perspective view of a first embodiment of a shift lock assembly with the lock lever in the low position.

Referring to FIGS. 1-6, there is shown a first embodiment of a shift lock assembly 5 according to the present invention. The shift lock assembly 5 includes a shifter base 10, and a shift lever 15 having a pivot member 20 associated with the shifter base 10. A detent member 25 including an upper portion 30 having engaging features 35 formed thereon is coupled to the pivot member 20. A lock lever 40 having opposing sides 45 and a first end 50 that is pivotally attached to the shifter base 10 with a second end 55 adapted to contact the engaging features 35 of the detent member 25 is also provided. At least one solenoid 60 is connected to the lock lever 40 to pivotally move the lock lever 40 relative to the detent member 25 such that the at least one solenoid 60 moves the lock lever 40 between low, middle and high positions in response to various control parameters.

The shifter base 10 is designed to accommodate the shift lever 15 and shift lock assembly of the present invention 5. The shifter base 10 includes a bottom surface 12 that is adapted to engage a floor of a vehicle to securely mount a shifter and various trim components of a shifter assembly. As can be seen in the figures, the shifter base 10 has a plurality of formations 14 formed thereon to accommodate the various components of the shift lock assembly 5.

A shift lever 15, utilized to move between various positions of a transmission, includes a pivot member 20 that is associated with the shifter base 10. The pivot member 20 is accommodated in slots 16 formed in the base 10 and allows for pivotal movement of the shift lever 15; thereby engaging different gears of a transmission. The pivot member 20 includes an outwardly extending boss 22 for connecting with the detent member 25. The connection of the pivot member 15 with the detent member 25 allows for concurrent pivotal movement of both the shift lever 15 and detent member 25.

Figure 4:
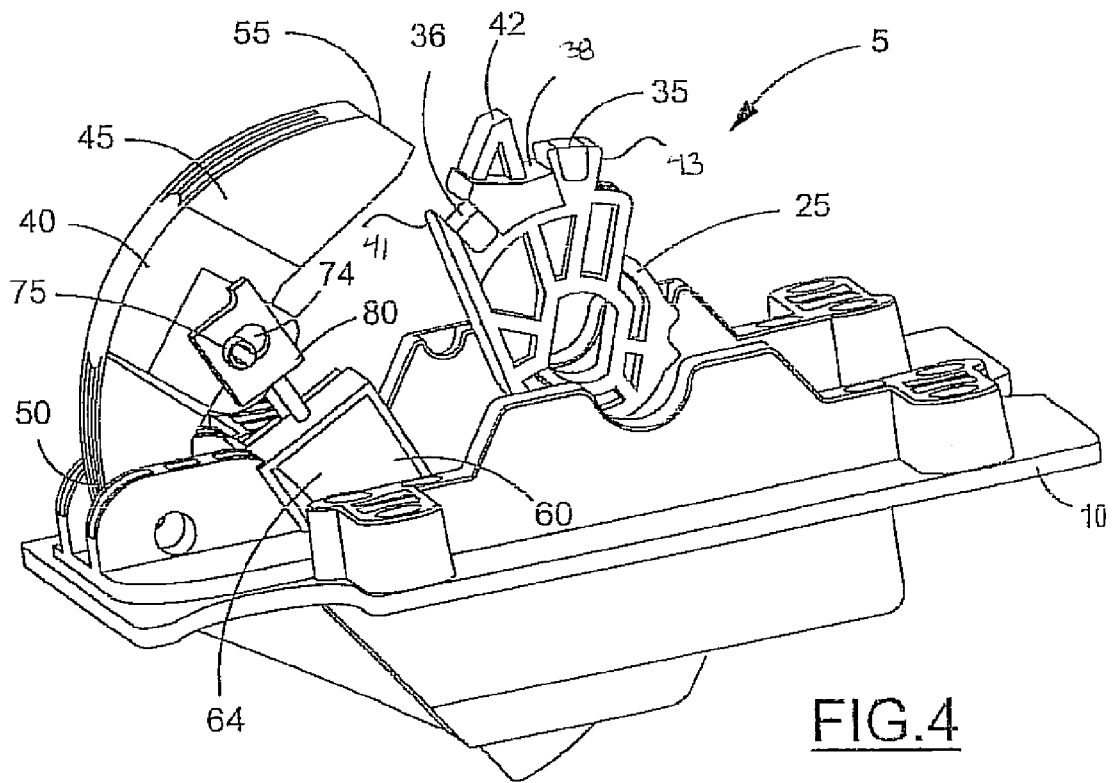
FIG. 4 is a partial perspective view of a first embodiment of a shift lock assembly with the lock lever in the high position.

The detent member 20, as best seen in FIG. 4 preferably includes an upper portion 30 that has engaging features 35 formed thereon. The engaging features 35 include a first notch 36 that corresponds to a park lock position and a second notch 38 corresponding to a neutral lock position. In a preferred aspect, the park lock notch 36 and neutral lock notch 38 are separated by a raised tab 42 that defines a reverse lockout feature. A second raised tab 41 is positioned aft of the first notch 36 to define the park lock out. A third raised tab 43 is positioned forward of the second notch 38 to define a neutral lock out.

The lock lever 40 includes opposing sides 45 and a first end 50 that is pivotally attached to the shifter base 10. A second end 55 of the lock lever 40 is adapted to contact the engaging features 35 of the detent member 15. As can be seen in FIGS. 1-6, the second end 55 includes a slot 65 formed in a bottom surface to accommodate the engaging features 35 formed on the detent member 15. The lock lever 40 preferably includes first and second pins 70, 75 formed on the opposing sides 45 for connecting to the at least one solenoid 60.

Figure 2:
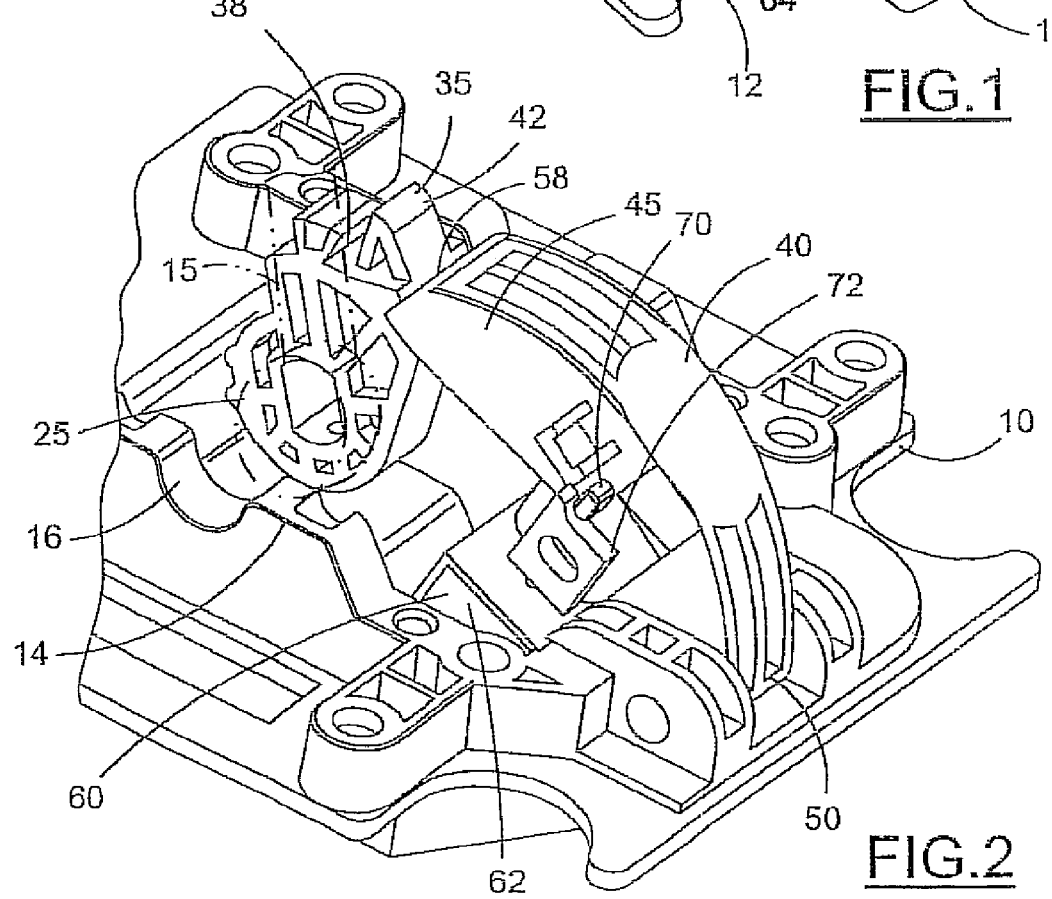
FIG. 2 is a partial perspective view of a first embodiment of a shift lock assembly with the lock lever in the low position.

In a preferred aspect of the first embodiment, the at least one solenoid 60 includes first and second solenoids 62, 64 positioned on opposite sides of the lock lever 40. The first and second solenoids 62, 64 include connection portions 80 that are adapted to engage the pins 70, 75 formed on the sides of the lock lever 40. The connection portion 80 of the first solenoid 62, as best seen in FIG. 2, includes a ramp surface 72 for contacting the first pin 70. The connection portion 80 of the second solenoid 64, as best seen in FIG. 1, includes a lost motion slot 74 formed therein for receiving the second pin 75.

The lost motion slot 74 allows the connection portion 80 of the second solenoid 64 to travel freely between the low, middle and high positions.

The first and second solenoids 62, 64 may be energized and powered down to adjust the corresponding height or position of the lock lever 40. In a preferred aspect, when the first and second solenoids 62, 64 are not energized they extend to a height corresponding to the low position of the lock lever 40. The low position of the lock lever 40 is utilized to provide both the park lock and neutral lock positions. The first solenoid 62 extends to a position when energized corresponding to the middle position of the lock lever 40. When the second solenoid 64 is energized it extends to a height corresponding to the high position of the lock lever 40. The low, middle, and high positions of the lock lever 40 are utilized to controllably engage the lock lever 40 with the engagement features 35 formed on the detent member 25 in response to various control parameters. The corresponding positions of the lock lever 40 in relation to the detent member 25 are utilized to define park lock, neutral lock and reverse lockout functions of a shifter assembly.

Figure 3:
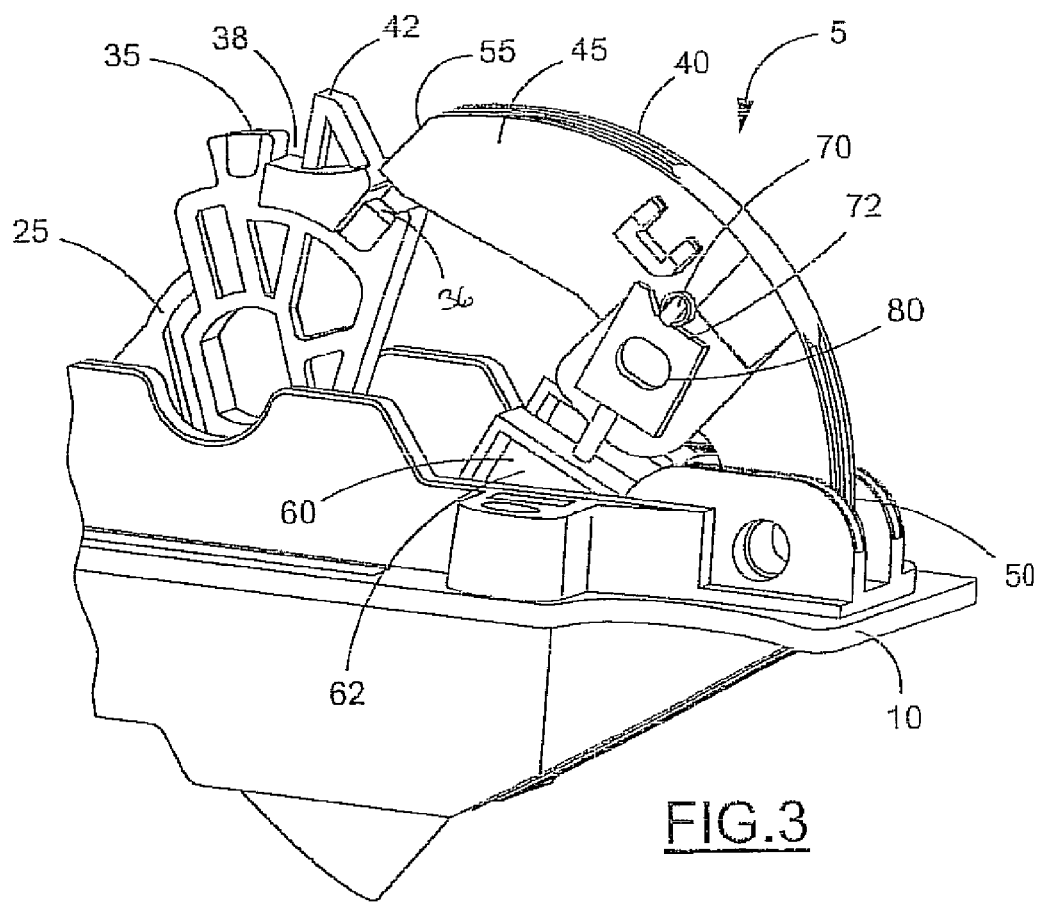
FIG. 3 is a partial perspective view of a first embodiment of a shift lock assembly with the lock lever in the middle position.
Figure 5:
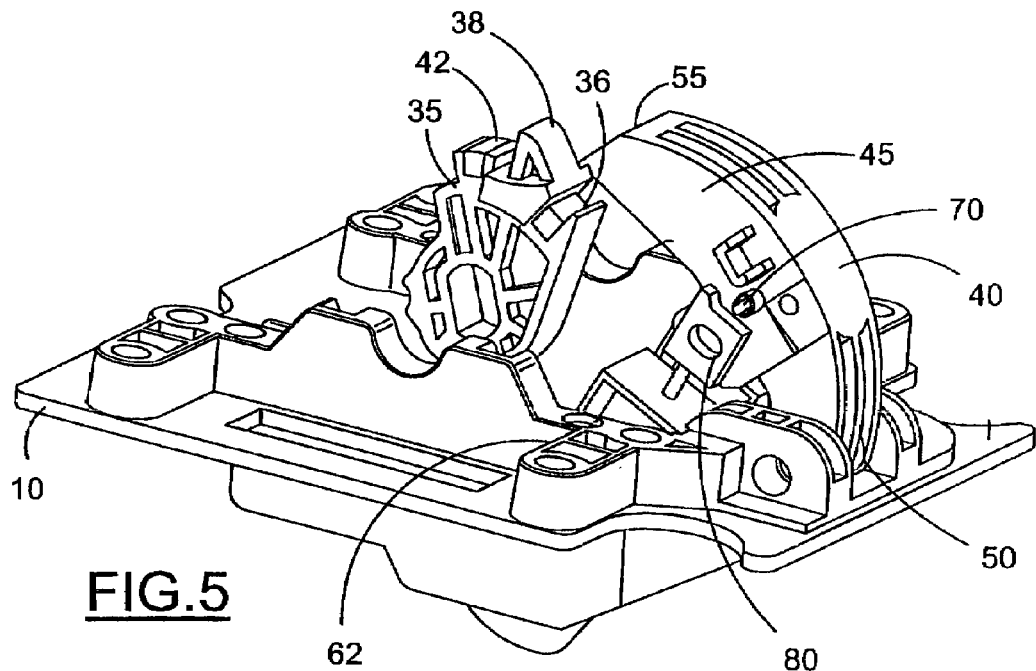
FIG. 5 is a partial perspective view of a first embodiment of a shift lock assembly with the lock lever in the high position.
Figure 6:
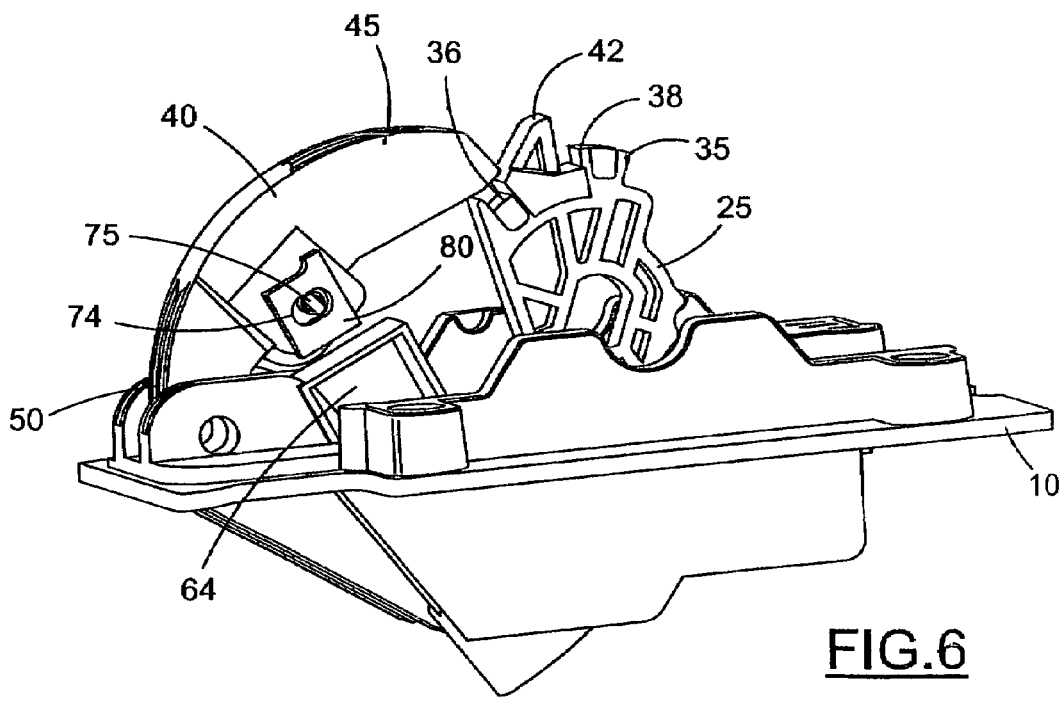
FIG. 6 is a partial perspective view of a first embodiment of the shift lock assembly with the lock lever in a middle position.

In use, a shift lever 15 is movable between park, reverse, neutral, and drive positions. As stated above, the shift lever 15 includes a pivot member 20 that is coupled to the detent member 25. In this manner, pivotal movement of the shift lever 15 results in corresponding pivotal movement of the detent member 25, such that different of the engaging features 35 are presented for contact with the second end 55 of the lock lever. 40. The park lock position, as shown in FIGS. 1 and 2, corresponds to the shift lever 15 moved to a park position, such that the park lock notch 36 is presented for contact with the second end 55 of the lock lever 40. Additionally, the first and second solenoids 62, 64 are not energized, such that the second end 55 of the lock lever 40 is retained within the park lock notch 36. Various control parameters may be utilized to define the park lock position. When the lock lever 40 is in the high position, as shown in FIGS. 4 and 5, the connection portion 80 of the first solenoid 62 is not contacting the first pin 70 as seen in FIG. 5, while the connection portion 80 of the second solenoid 64 has the second pin 75 all the way to the rear of the lost motion slot 74 causing the lock lever 40 to rise to the high position. The high position will allow the shift lever 15 to be moved between any of the various positions including park, reverse, neutral and drive positions. Various control parameters may be utilized to define the high position including speed, brake depression, and other control parameters associated with the transmission and shift lever 15 of the automobile. When the lock lever 40 is in the middle position, as shown in FIGS. 3 and 6, the first solenoid 62 is energized and the connection portion 80 engages the first pin 70 of the lock lever 40; thereby causing angular movement of the lock lever 40 to the middle position. The connection portion 80 of the second solenoid 64 has the pin 75 associated with the second side of the lever 40 traveling within the lost motion slot 74; thereby accommodating movement of the first solenoid 62. The middle position may be utilized as a reverse lockout position, such that the shift lever 15 is capable of moving between drive and neutral positions but cannot be moved above the tab defining the reverse lockout, thereby preventing movement into reverse under certain conditions. Again, various control parameters may be utilized to define the middle position of the lock lever 40.

Figure 7:
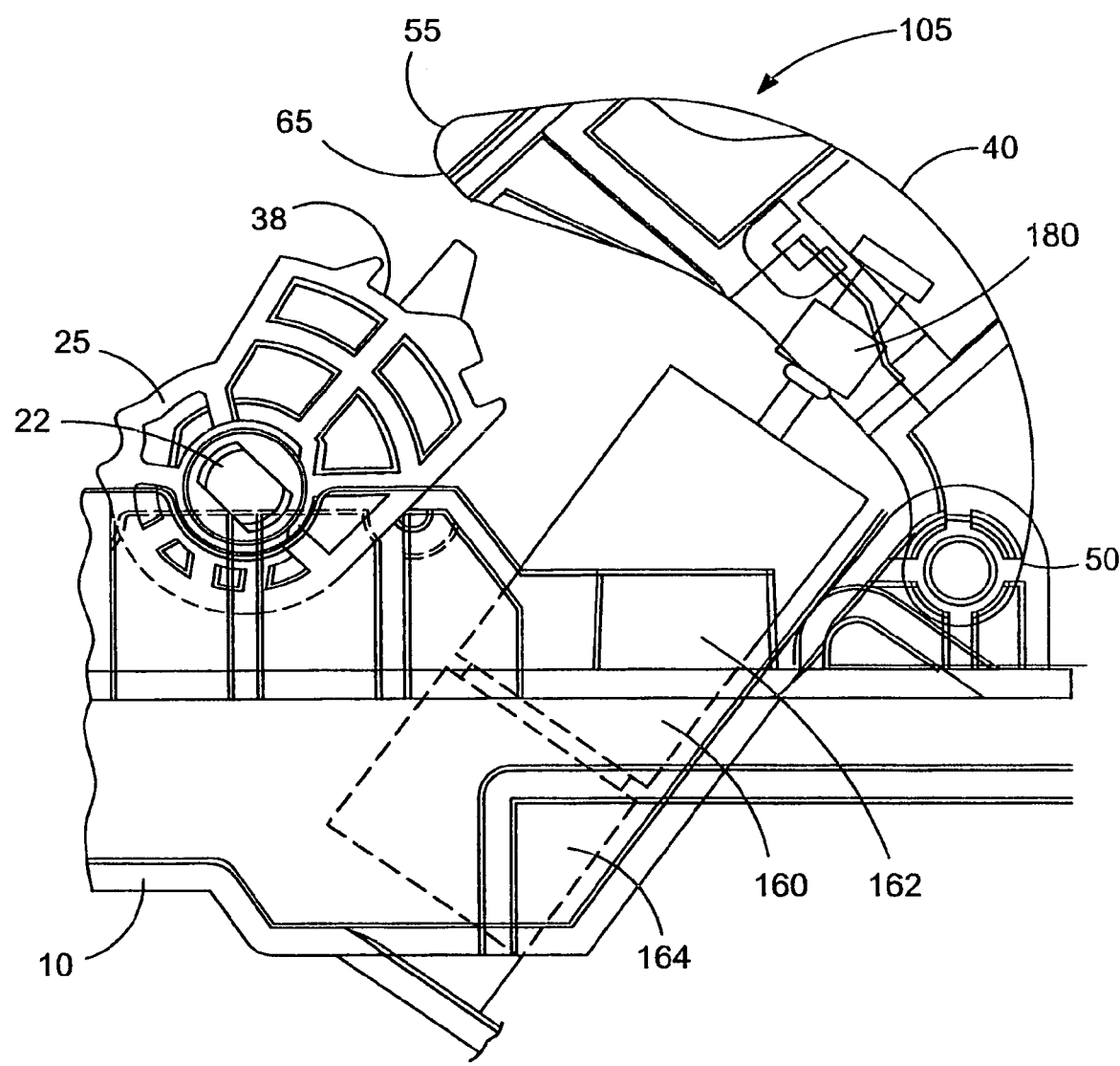
FIG. 7 is a partial side sectional view of a second embodiment of a shift lock assembly with the lock lever in a high position.
Figure 8:
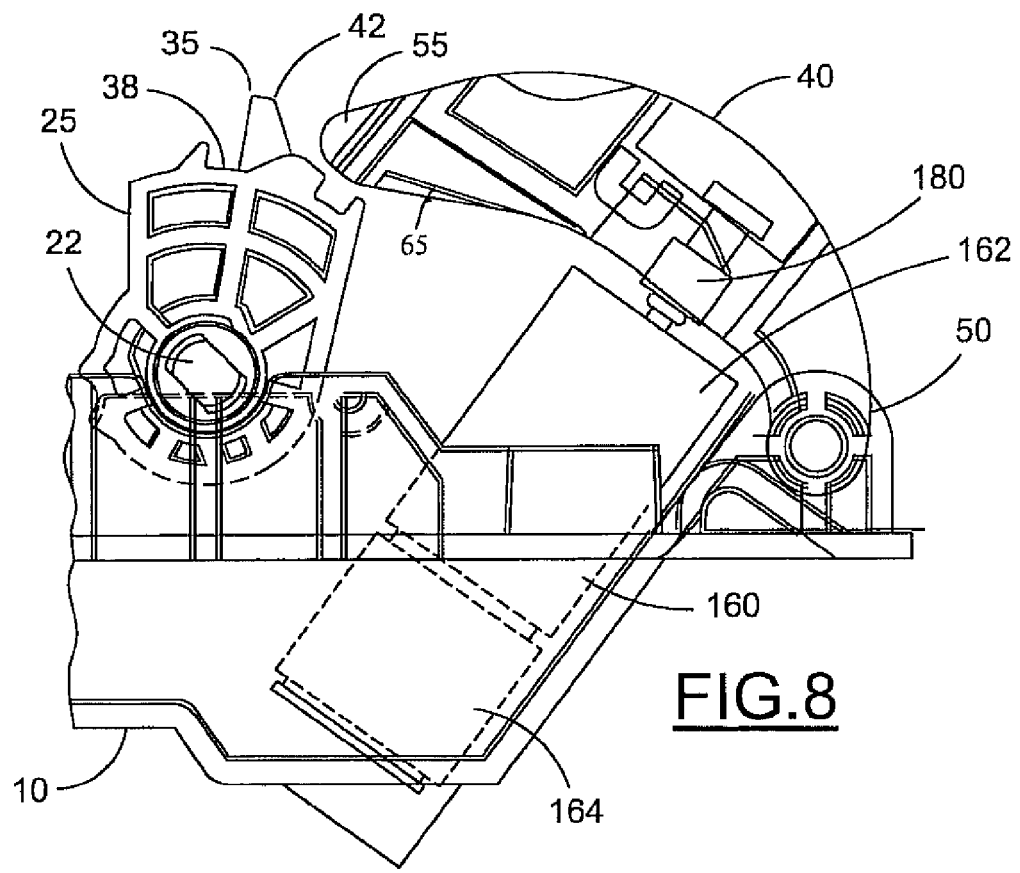
FIG. 8 is a partial side sectional view of a second embodiment of a shift lock assembly with the lock lever in a low position.
Figure 9:
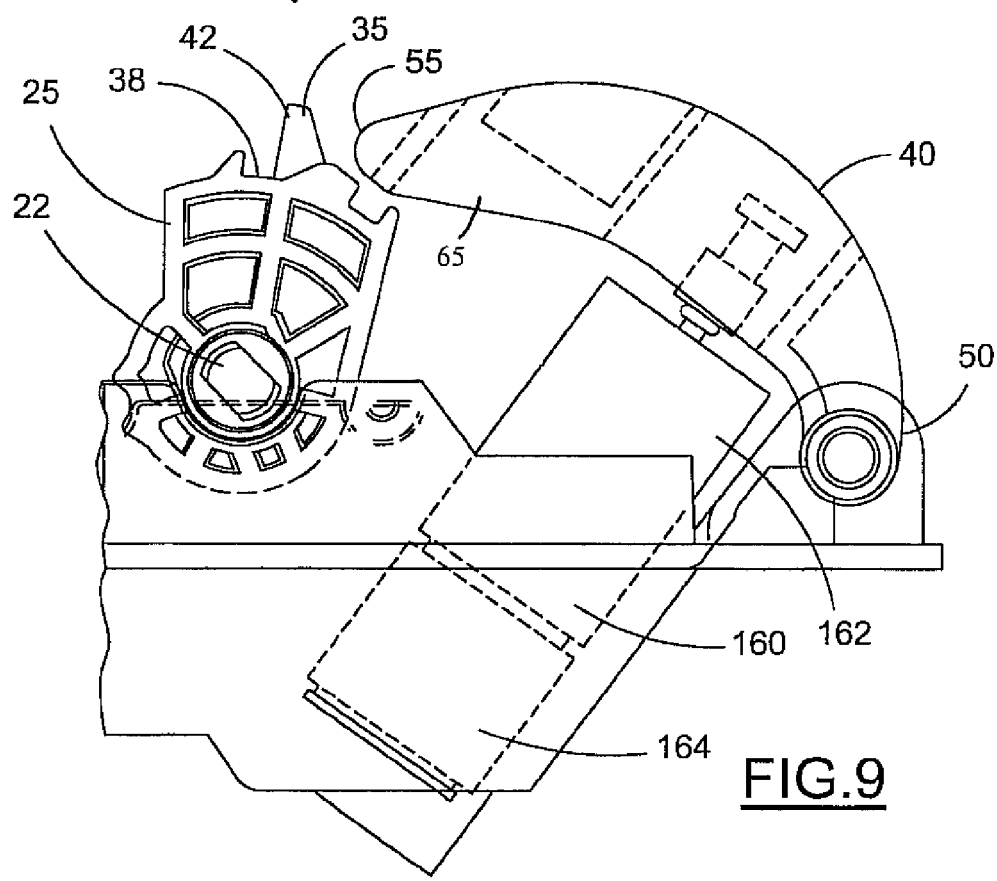
FIG. 9 is a partial side sectional view of a second embodiment of a shift lock assembly with the lock lever in the middle position.

Referring to FIGS. 7, 8 and 9, there is shown a second embodiment of the shift lock assembly 105 of the present invention. The second embodiment is similar to that of the first embodiment including a shifter base 10, shift lever 15, detent member 25, and lock lever 40, as previously described in the first embodiment. However, the second embodiment of the shift lock assembly 105 includes a single solenoid 160 rather than the first and second solenoids 62, 64 of the first embodiment. The single solenoid 160 includes first and second sections 162, 164 such that when the first section is energized, the solenoid 160 has a height corresponding to the middle position of the lock lever 40 and when the second section 164 of the solenoid 160 is energized, the solenoid 160 has a height corresponding to the high position of the lock lever 40. As there is only one solenoid 160 in the second embodiment, only one connection portion 180 is coupled to the lock lever 40. Therefore, the first and second connection portions 80 and the first and second pins 70, 75 associated with the lock lever 40 in the first embodiment are not included.

As with the previously defined first embodiment, in use the single solenoid 160 of the second embodiment performs all the functions previously defined with respect to the first embodiment, allowing the lock lever 40 to be moved from low, middle and high positions in response to various control parameters.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A shift lock assembly comprising:
a shifter base;
a shift lever including a pivot member associated with the shifter base;
a detent member having an upper portion including engaging features formed thereon, the engaging features including a first notch corresponding to a park lock position, and a second notch separated from the first notch corresponding to a neutral lock position, a raised tab is positioned between the first notch and second notch for reverse lock out, a second raised tab is positioned aft of Pie first notch for park lock out and a third raised tab is positioned forward of the second notch for neutral lock out, the detent member coupled to the pivot member;
a lock lever having opposing sides and including a first end pivotally attached to the shifter base and a second end having a slot formed in a bottom surface of the lock lever accommodating the engaging features of the detent member;
first and second solenoids positioned on opposing sides of the lock lever and connected to the lock lever for pivotally moving the lock lever relative to the detent member wherein the first and second solenoids move the lock lever between low, middle and high positions in response to control parameters.

2. The shift lock assembly of claim 1 wherein the positions are adjusted by varying the energized state of the first and second solenoids.

3. The shift lock assembly of claim 1 wherein the first solenoid extends to a height when energized corresponding to the middle position of the lock lever.

4. The shift lock assembly of claim 1 wherein the second solenoid extends to a height when energized corresponding to the high position of the lock lever.

5. The shift lock assembly of claim 1 wherein the first and second solenoids extend to a height when not energized corresponding to the low position of the lock lever.

6. The shift lock assembly of claim 1 wherein the lock lever includes first and second pins formed on the opposing sides for connecting to the first and second solenoids.

7. The shift lock assembly of claim 6 wherein the first and second solenoids include connection portions adapted to engage the pins formed on the side of the lock lever.

8. The shift lock assembly of claim 7 wherein the connection portion of the first solenoid includes a ramp surface for contacting the first pin, and wherein the connection portion of the second solenoid includes a lost motion slot formed therein for receiving the second pin.

9. A shift lock assembly comprising:
a shifter base;
a shift lever movable between park, reverse, neutral and drive positions, the shift lever including
a pivot member associated with the shifter base;
a detent member having an upper portion including engaging features formed thereon, the engaging features including a first notch corresponding to a park lock position, and a second notch separated from the first notch corresponding to a neutral lock position, a raised tab is positioned between the first notch and second notch, a second raised tab is positioned aft of the first notch and a third raised tab is positioned forward of the second notch, the detent member coupled to the pivot member;
a lock lever including a first end pivotally attached to the shifter base and a second end having a slot formed in a bottom surface of the lock lever accommodating the engaging features of detent member;
first and second solenoids connected to the lock lever for pivotally moving the lock lever relative to the detent member wherein the first and second solenoids move the lock lever between a low locked position preventing movement of the shift lever, to a middle position allowing limited movement of the shift lever and a high position allowing unrestrained movement of the shift lever between the park, reverse, neutral and drive positions of the shift lever and wherein the first and second solenoids are positioned on opposing sides of the lock lever and wherein the first solenoid extends to a height when energized corresponding to the middle position of the lock lever and the second solenoid extends to a height when energized corresponding to the high position of the lock lever and wherein the first and second solenoids extend to a height when not energized corresponding to the low position of the lock lever.

10. The shift lock assembly of claim 9 wherein the park lock position is defined by the lock lever contacting the first notch of detent member and the at least one solenoid is in the low position.

11. The shift lock assembly of claim 9 wherein the neutral lock position is defined by the lock lever contacting the second notch of detent member and the at least one solenoid is in the low position.

12. The shift lock assembly of claim 9 wherein the first and second solenoids include connection portions adapted to engage the pins formed on the side of the lock lever and wherein the connection portion of the first solenoid includes a ramp surface for contacting the first pin, and wherein the connection portion of the second solenoid includes a lost motion slot formed therein for receiving the second pin.

13. A shift lock assembly comprising:
a shifter base;
a shift lever including a pivot member associated with the shifter base;
a detent member having an upper portion including engaging features formed thereon, the detent member coupled to the pivot member;
a lock lever having opposing sides and including a first end pivotally attached to the shifter base and a second end adapted to contact the engaging features of the detent member;
first and second solenoids including connection portions adapted to engage pins formed on sides of the lock lever, the first and second solenoids connected to the lock lever for pivotally moving the lock lever relative to the detent member wherein the first and second solenoids move the lock lever between low, middle and high positions in response to control parameters and wherein the connection portion of the first solenoid includes a ramp surface for contacting a first pin, and wherein the connection portion of the second solenoid includes a lost motion slot formed therein for receiving a second pin.

* * * * *